Sept. 1, 1970     F. L. STEEN ET AL     3,526,812

POWER SUPPLY FOR CIRCUIT BREAKER TRIPPING

Filed April 6, 1967     2 Sheets-Sheet 1

INVENTORS:
FLOYD L. STEEN,
CHARLES H. TITUS,
BY William Freedman
ATTORNEY

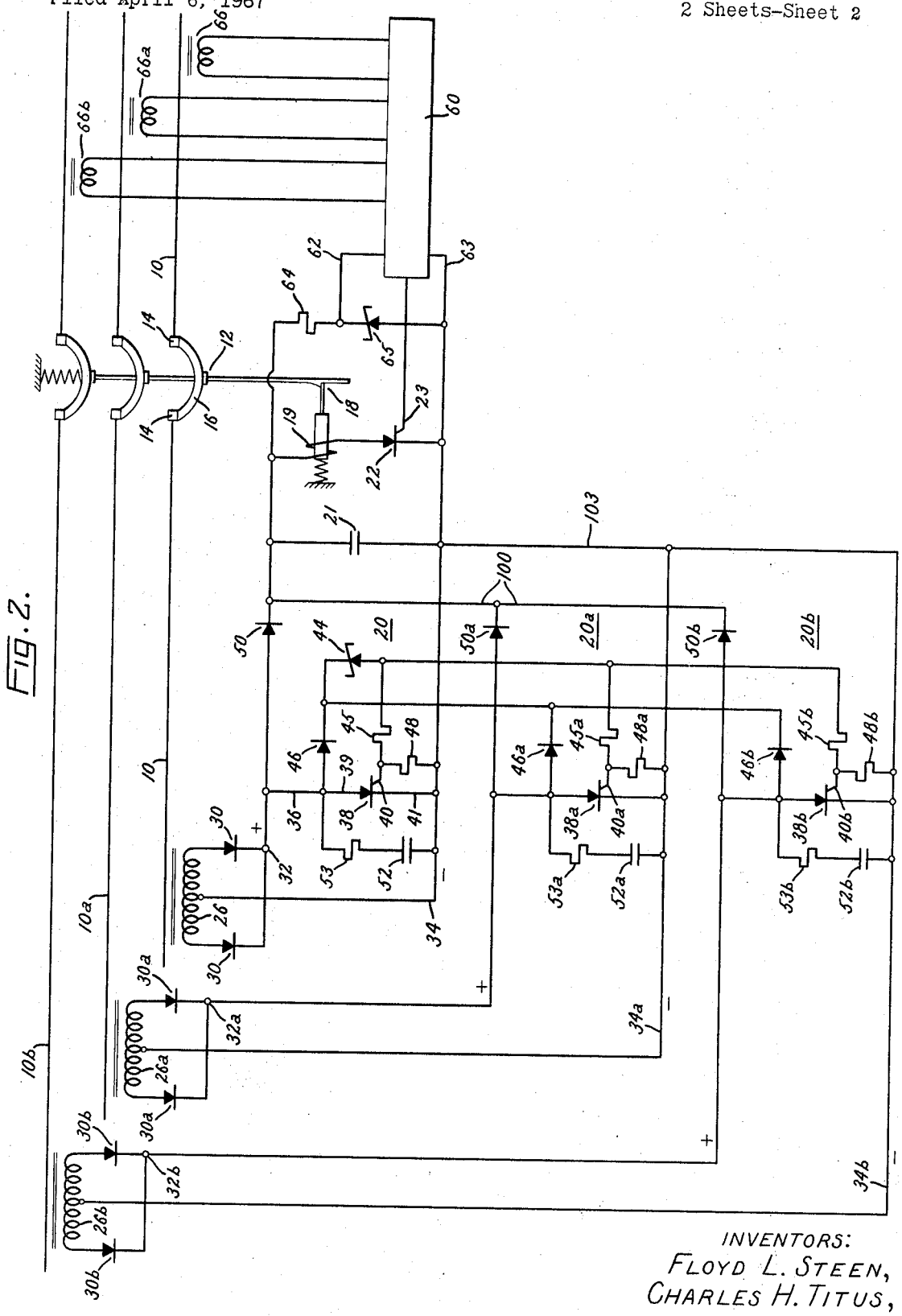

United States Patent Office
3,526,812
Patented Sept. 1, 1970

1

3,526,812
POWER SUPPLY FOR CIRCUIT BREAKER TRIPPING
Floyd L. Steen, Lansdowne, and Charles H. Titus, Newtown Square, Pa., assignors to General Electric Company, a corporation of New York
Filed Apr. 6, 1967, Ser. No. 628,853
Int. Cl. H02h 7/16, 3/10, 7/10
U.S. Cl. 317—33    5 Claims

ABSTRACT OF THE DISCLOSURE

A power supply for providing tripping energy for a circuit breaker connected in a power circuit. Comprises a capacitor which is charged by unidirectional pulsating current derived from the power circuit through a current transformer and rectifying means. A low impedance path is established across the current transformer secondary by a Zener diode-controlled, shorting thyristor when the instantaneous voltage across the capacitor reaches a predetermined level, thus blocking a further increase in capacitor voltage until the next half cycle of the pulsating current.

BACKGROUND OF THE INVENTION

This invention relates to a power supply for supplying tripping energy for a circuit breaker, and, more particularly, relates to a power supply of this type that comprises a current transformer for deriving the tripping energy from a power circuit in which the circuit breaker is connected.

The power supply of the present invention also comprises an energy-storing capacitor that is discharged at an appropriate instant to effect circuit breaker tripping. This capacitor is charged prior to tripping by energy derived from the aforesaid power circuit through the current transformer. A current transformer lends itself especially well to such charging duty because it depends for its proper operation only upon line current and not upon the presence of line voltage. This independence from line voltage is desirable because there are occasions when little or no line voltage is present and the capacitor requires charging to prepare it for a tripping operation. An example of such an occasion is when the circuit breaker is closed on a short circuit to ground with the capacitor in a discharged condition at the beginning of the closing operation. The short circuit would prevent voltage from being reestablished on the line, and a voltage-dependent charging means would be unable to effect the desired charging operation. But a current transformer can provide the energy for charging since it can respond to the current that accompanies closing on the short circuit, even though no line voltage is present.

If the charging operation is to begin only when line current begins, it must be performed very rapidly in order to prepare the capacitor for a tripping operation, which might be required almost immediately.

SUMMARY

Accordingly, an object of the invention is to provide means including a current transformer for effecting high speed charging of the tripping capacitor, particularly when the line current is high, indicating that a tripping operation may soon be needed.

Another object is to provide precise control of the voltage to which the capacitor is charged, supplying energy to the capacitor whenever the voltage drops below a predetermined level and terminating the flow of energy into the capacitor as soon as the voltage reaches said predetermined level.

In carrying out the invention in one form, we provide a power supply for supplying tripping energy for a circuit breaker connected in a power circuit. This power supply comprises a capacitor for storing tripping energy and a charging circuit for said capacitor for deriving charging energy from said power circuit. This charging circuit comprises a current transformer secondary winding and rectifying means in circuit therewith for deriving from the power circuit a pulsating unidirectional current having a magnitude that varies as a direct function of the current through the power circuit. The charging circuit also includes means for supplying the pulsating current to the capacitor to increase the voltage appearing thereacross. Means is provided for establishing a low impedance path across the current transformer secondary winding when the instantaneous voltage across the capacitor reaches a predetermined level, thereby blocking a further increase in the voltage appearing across the capacitor.

BRIEF DESCRIPTION OF DRAWINGS

For a better understanding of the invention, reference may be had to the following description taken in conjunction with the accompanying drawings, wherein:

FIG. 2 is a diagrammatic view of another embodiment of our invention, applied in this case to a polyphase circuit breaker.

DESCRIPTION OF PREFERRED EMBODIMENTS

Figure 1:
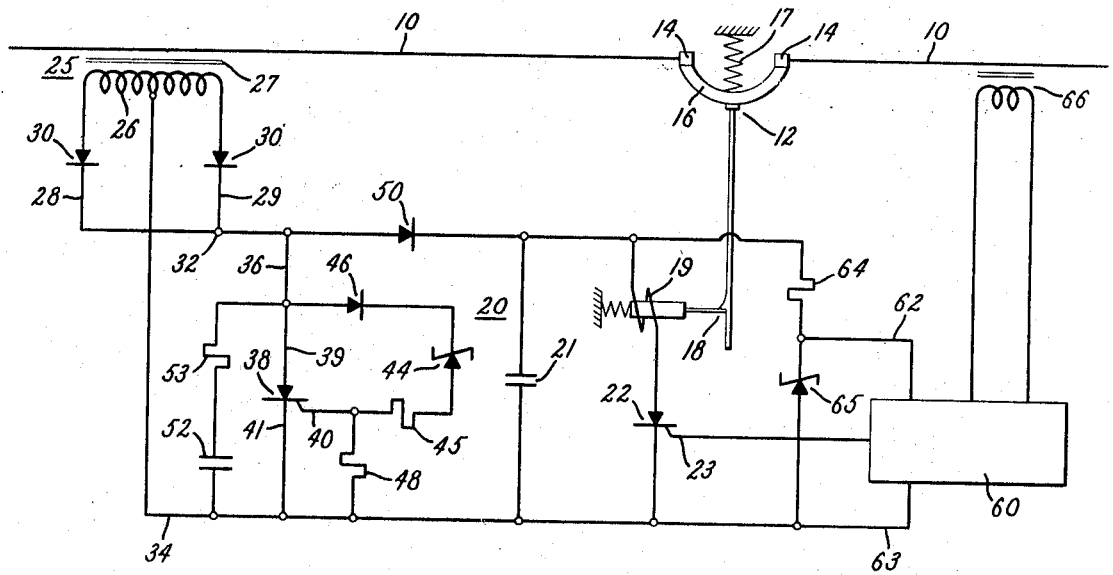
FIG. 1 is a diagrammatic view of a power supply embodying one form of our invention. The power supply is shown applied to a single phase circuit breaker.

Referring now to FIG. 1, there is shown a power circuit 10 in which a circuit breaker 12 is connected. The circuit breaker 12 may be of a conventional design and, as such, comprises a pair of stationary contacts 14 and a movable bridging contact 16, which is biased toward open position from its closed position illustrated by an opening spring 16. The circuit breaker is held in its illustrated closed position by a suitable trip latch 18 controlled by the trip coil 19 of a suitable tripping solenoid. When trip coil 19 is energized, it causes the tripping solenoid to release latch 18, thereby permitting spring 16 to separate the contacts 14, 16.

For supplying tripping power to the trip coil 19 a power supply 20 is provided. This power supply comprises an energy-storing capacitor 21 across which the series combination of the trip coil 19 and a normally-off thyristor 22 are connected. The normally-off thyristor 22, which may be a silicon controlled rectifier, is turned on by applying a suitable tripping signal to its gate 23. Assuming the capacitor 21 is then charged, turning-on of thyristor 22 permits the capacitor to discharge through trip coil 19, thereby tripping the circuit breaker.

The energy stored in the capacitor 21 is derived from the power circuit 10 through a current transformer 25. This current transformer 25 comprises a secondary winding 26 and a core 27, suitably constructed in a conventional manner to minimize the effects of residual magnetism. The secondary winding 26 is center tapped and has a half-wave rectifier 30 in each of its terminal leads 29 and 28, which are joined together at a junction point 32. The capacitor 21 is connected between this junction point 32 and a point 34 on the center tap lead. The current through point 32 is normally a full-wave rectified unidirectional current. If the capacitor 21 is in a discharged condition, this unidirectional pulsating current flows through it, storing energy therein, and increasing the voltage appearing thereacross.

For terminating the flow of current through capacitor 21 when the voltage thereacross increases to a predetermined level, we provide a normally nonconductive shunting circuit 36 between the points 32 and 34. This shunting circuit contains a normally-off thyristor or silicon-controlled rectifier, 38, having an anode lead 39, a gate lead 40 and a cathode lead 41. Connected between the anode lead 39 and the gate lead 40 is a voltage sensitive triggering circuit comprising the series combination of a Zener diode 44, a current controlling resistor 45, and an isolating diode 46. An additional resistor 48 is connected between gate 40 and cathode 41 to provide negative gate bias for reducing the sensitivity of the thyristor 38 to firing in response to radio noise and the like.

The voltage appearing across the Zener diode 44 is directly proportional to the voltage appearing across the capacitor 21 during the capacitor charging interval. The Zener diode 44 is normally nonconducting but when the voltage appearing thereacross reaches a predetermined breakdown value, the Zener diode becomes conducting and continues conducting until the voltage thereacross falls below its breakdown voltage. The current components 45, 48 and 44 are so selected that the Zener diode 44 becomes conductive during a charging operation when the voltage across capacitor 21 reaches the predetermined value to which it is desired to maintain the capacitor charged.

When the Zener diode 44 breaks down, current flows therethrough and through gate 40 of the thyristor 38. This immediately renders the thyristor 38 conductive, establishing a low impedance path therethrough between its anode 39 and cathode 41. The output current from the current transformer secondary 26, which had been flowing through capacitor 21, is thereafter diverted through low impedance shunting circuit 36 via 39, 41.

Since the Zener diode breaks down during a charging operation when the voltage across capacitor 21 reaches the predetermined level to which it is desired to maintain the capacitor charged, it will be apparent that the normally-open shunting circuit 36 is effectively closed when voltage across the capacitor reaches this predetermined level. Accordingly, charging of capacitor 21 is terminated when its voltage reaches said predetermined level. The capacitor 21, however, does not discharge through the shunting path 36 or through gate 40 since it is blocked from doing so by the blocking diode 50.

For turning off the thyristor 38 after it has been fired, we rely upon the pulsating character of the current flowing therethrough between points 32 and 34. More specifically, when the output current from the secondary winding 26 falls to zero between successive pulses, the thyristor 38 returns to its normally nonconductive state. The Zener diode had become nonconductive as soon as the thyristor had been fired since such firing established a short circuit through 39, 41 across its terminals. Thus, the shunting circuit 36 and voltage sensing circuit 44–36 are reset prior to the next succeeding current pulse.

Between the instant of firing the thyristor 38 and the beginning of the next current pulse, a slight amount of the capacitor charge will be lost through leakage reducing its voltage slightly. Accordingly, the initial portion of the next current pulse flows through capacitor 21, restoring its charge to the aforementioned predetermined level, whereupon the Zener diode breaks down, firing thyristor 38 and diverting the remaining portion of the current pulse through shunting circuit 36. This sequence of events is repeated on each succeeding half cycle. The blocking diode 50 prevents the capacitor 21 from discharging through shorting circuit 36 or gate 40 and thus assures that the capacitor will retain most of its voltage between current pulses.

For protecting the shorting thyristor 38 from being fired unintentionally by a high rate of voltage change ($dv/dt$) in the anode-to-cathode voltage, we connect the series combination of a capacitor 52 and a resistor 53 in parallel with the thyristor 38 between its anode and cathode.

For firing the tripping thyristor 22 in response to predetermined circuit conditions, such as overcurrent, a time-overcurrent relay 60 is provided. This time-overcurrent relay 60 can be of any suitable conventional form and is therefore shown in block form only. An example of a suitable time-overcurrent relay is shown in application S.N. 361,520—Steen, filed Apr. 21, 1964, or U.S. Pat. 3,155,879—Casey et al., both of which are assigned to the assignee of the present invention. Bias power for this relay is derived from the capacitor 21 and is supplied through leads 62 and 63 to a high impedance component of the relay. The series combination of a resistor 64 and a Zener diode 65 are connected across the capacitor 21 and the leads 62 and 63 are connected across the Zener diode 65. The Zener diode maintains a constant voltage across leads 62, 63. Information on line current is supplied to the time-overcurrent relay 60 through a current transformer 66 coupled to power circuit 10. When the current through power circuit 10 reaches a predetermined value, the time-overcurrent relay operates after a predetermined time, the duration of which varies inversely with respect to the current magnitude, to supply a triggering signal to gate circuit 23. This fires thyristor 22 to discharge capacitor 21 through trip coil 19, thereby tripping the circuit breaker.

Assume now that the circuit breaker is operated from open to closed position by a closing operation begun when the capacitor 21 was completely discharged. Assume that a fault is then present on the power circuit 10. A high current flows through power circuit 10 in response to closing under these conditions, and this produces an output current from transformer 25 that rapidly rises to a relatively high value. This rapidly rising current is used to rapidly charge the capacitor 21, thereby rapidly supplying the desired bias voltage across leads 62, 63 to the time-overcurrent relay 60 and also preparing the capacitor 21 for an impending tripping operation.

The core 27 of the power supply current transformer 25 may saturate prior to the capacitor voltage reaching the predetermined level required for tripping, but the capacitor voltage will always be high enough by this time to establish the desired bias voltage across leads 62, 63. If the core 27 saturates on the first half cycle of current through the secondary winding 26, the secondary current will fall to zero and charging will be suspended until the next half cycle of current. On this next half cycle, the capacitor voltage will be further increased either until saturation occurs or until the shorting thyristor 38 is fired in response to the desired capacitor voltage being attained. As soon as the desired capacitor voltage is attained, which is within one cycle under high current conditions, the capacitor 21 is ready to effect a tripping operation in response to firing of thyristor 22 by the overcurrent relay 60.

It will be apparent from the above description that, for currents up to the level that produce saturation of core 27, the higher the current through power circuit 10, the faster will be the rate at which capacitor 21 is charged. This is a desirable characteristic because the higher the current, the faster the overcurrent relay 60 will operate, and the shorter will be the time available in which to prepare the capacitor 21 for circuit-breaker tripping.

It will also be apparent from the above description that the voltage across the capacitor 21 is effectively checked by the Zener diode 44 at the beginning of and during each half cycle of current, and an amount of energy commensurate with that needed to fully charge the capacitor is supplied to the capacitor during the ensuing half cycle.

A current transformer is an especially desirable device for supplying charging energy to a capacitor because the voltage appearing across its secondary increases with the value of impedance connected thereacross. Thus, the current transformer is automatically capable of developing higher and higher voltages as the effective impedance of the capacitor increases in response to charge buildup. Even if the primary current is low and the capacitor 21 is almost at its desired high voltage, the current transformer is still capable of developing sufficient voltage across its terminals 32, 34 to force additional charging energy into the capacitor.

In view of the immediately preceding paragraph, it will be apparent that charging of the capacitor 21 can take place during the flow of normal current through the power line 10, even low values of normal current. Overcurrents are not needed to produce charging.

Although applied in FIG. 1 to a single phase circuit breaker, our invention is applicable to polyphase circuit breakers as well. For example, referring to FIG. 2, there is shown a three phase circuit breaker 12 for controlling the current through the three phases 10, 10a, and 10b of a three phase power circuit. The energy-storing capacitor 21 and the tripping means 19, 22 is the same as for the single phase circuit breaker of FIG. 1. The time-overcurrent relay 60 can be substantially the same as that of FIG. 1 except that it is modified to respond to an overcurrent in any one of the three phases. Three current transformers 66, 66a, and 66b coupled to the respective phases are used for supplying information on the phase current to relay 60.

In the embodiment of FIG. 2, the energy-storing capacitor 21 can be charged by charging means 20 coupled to phase conductor 10 and corresponding to the identically-designated charging means of FIG. 1. But in addition the capacitor 21 can also be charged through similar charging circuits 20a and 20b respectively coupled to the other phase conductors 10a and 10b. The charging circuits 20a and 20b are substantially identical to the charging circuit 20 except that they do not contain a voltage-sensing Zener diode such as that shown at 44 in charging circuit 20. Only one capacitor 21 is used, and only one Zener diode 44 is used for sensing the voltage across the capacitor during a charging operation. Corresponding parts in the charging circuits have been assigned corresponding reference numerals, but with the suffixes a and b in diffferent circuits.

It will be apparent that any one of the three charging circuits 20, 20a, or 20b is capable of supplying charging energy to capacitor 21 since the positive buses of the three charging circuits are connected to the upper terminal of the capacitor 21 and the negative buses are connected to the lower terminal of the capacitor 21. Conductor 100 is used for connecting the positive buses of charging circuits 20a and 20b to the upper terminal of the capacitor 21, and conductor 103 for connecting the negative buses to the lower terminal. Note that blocking diodes 50a and 50b are included in the positive buses of charging circuits 20a and 20b to prevent the capacitor from finding a discharge path through these charging circuits.

If the capacitor 21 is being charged by any one of the three charging circuits and its voltage rises to the predetermined desired level, the Zener diode 44 will break down and current will flow therethrough and through the gates 40a and 40b of the three shorting thyristors 38, 38a, 38b, proper current division being assured by gate resistors 45, 45a and 45b in the three gate circuits. This gate current will fire all three shorting thyristors substantially simultaneously. As soon as the first thyristor fires, the Zener diode 44 return to its nonconductive condition since the reverse voltage thereacross is then reduced to essentially zero. Thereafter, each thyristor returns to its nonconducting condition as soon as the half-wave rectified current flowing therethrough reaches zero.

Immediately following current zero in a given conducting thyristor, the thyristor recovers its blocking ability. When the voltage across the associated secondary winding builds up during the next half cycle of current, current is forced through the capacitor 21, increasing the capacitor voltage toward the desired predetermined level. If this level is reached, the Zener diode 44 breaks down to fire all the shorting thyristors not then conducting.

It will be apparent from the above that on each half cycle of current flowing through the input terminals of a given charging circuit, 20, 20a or 20b, the voltage across the capacitor 21 is checked by the Zener diode 44 and the charging circuit supplies energy to the capacitor if the capacitor voltage is below the desired predetermined value. The charging circuit supplies energy to the capacitor on each half cycle either until the core of the current transformer saturates or the associated shorting thyristor is fired in response to the capacitor voltage reaching the desired level, or, if neither of these events occur, until a natural current zero is reached.

Even though the shorting thyristor of one charging circuit may be conducting at a given instant, the other charging circuits can still perform a charging operation because the shorted charging circuit is isolated from the others by one of the isolating diodes 46, 46a, or 46b, as the case may be.

The immediate availability of any one of the three charging circuits to charge capacitor 21 is advantageous since it enables charging to be initiated with a minimum of delay anytime the capacitor voltage is below the desired level, thus reducing the time the capacitor voltage remains below the desired level.

Figure 3:
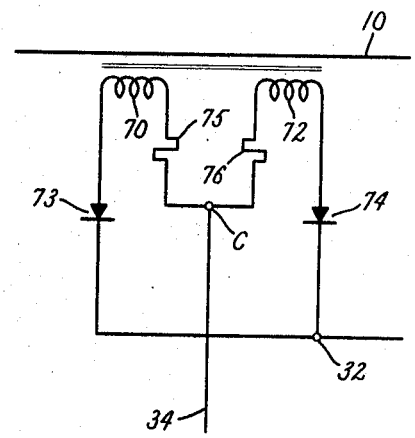
FIG. 3 is a diagrammatic view of a modified form of center-tapped current transformer secondary, specifically suitable for tripping circuit breakers with high continuous current ratings and high fault current ratings.

FIG. 3 shows a modified form of center-tapped current transformer secondary which can advantageously be used in place of each of the previously-described current transformer secondaries 26, 26a and 26b in certain circuit applications, specifically for tripping circuit breakers with high continuous current ratings and high fault current ratings. In this modification, the current transformer secondary winding is divided into two sections 70 and 72 with the center-tap lead 34 connected between them at an intermediate point C. The half-wave rectifiers in each output lead are designated 73 and 74. Between the intermediate point C and one rectifier 73, we add a first resistor 75, and between C and the other rectifier 74, we add a second resistor 76. At high fault current levels, the conducting resistor provides an IR drop which reduces the reverse voltage across the non-conducting rectifier, thus permitting the use of rectifiers with lower peak inverse voltage ratings. In addition, the presence of the resistor in the output circuit of the conducting transformer section causes the core of the current transformer to saturate at a lower value of current under high primary current conditions, thus forcing the current through the associated shorting thyristor (38, 38a, or 38b of FIG. 2) to reach zero at an earlier instant, thereby giving the thyristor a longer time to recover its forward blocking ability following conduction. This permits the use of a thyristor with a lower short-time current rating.

While we have shown and described particular embodiments of our invention, it will be obvious to those skilled in the art that various changes and modifications may be made without departing from our invention in its broader aspects.

We we claim as new and desire to secure by Letters Patent of the United States is:

1. A power supply for supplying tripping energy for a circuit breaker connected in a power circuit comprising:
   (a) a capacitor for storing tripping energy,
   (b) tripping means operable to effect circuit-breaker tripping,
   (c) means comprising a normally-off switching device that can be turned on to cause said capacitor to discharge through said tripping means to effect operation thereof,
   (d) means for charging said capacitor from said power circuit even when said power circuit is free of overcurrent, comprising:
      (i) means comprising a current transformer having a secondary winding and rectifying means in circuit with said secondary winding for deriving from said power circuit a pulsating unidirectional current having a magnitude that varies as a direct function of the current through said power circuit,
      (ii) means for supplying said pulsating current to said capacitor to increase the voltage appearing across said capacitor,
      (iii) and means for establishing a low impedance path across said current transformer secondary winding when the instantaneous voltage across said capacitor during a charging operation reaches a predetermined level, thereby blocking a further increase in the voltage appearing across said capacitor,
   (e) and blocking means preventing said capacitor from discharging through said low impedance path,
   (f) said means for establishing a low impedance path across said current transformer secondary winding comprising:
      (i) a normally nonconductive thyristor having its anode to cathode circuit connected across said secondary winding and having a gate for rendering said thyristor conducting when energized by a triggering signal, and
      (ii) voltage-responsive means responsive to the voltage across said capacitor during a charging operation for applying a triggering signal to said gate when the voltage across said capacitor reaches said predetermined level,
   (g) said blocking means comprising a unidirectionally-conductive current blocking device located electrically between said capacitor and said gate in a circuit position to prevent said capacitor from discharging through said gate.

2. The power supply of claim 1 in which said voltage responsive means comprises a breakdown device connected between the anode and the gate of said thyristor.

3. A power supply for supplying tripping energy for a circuit breaker connected in a polyphase A-C power circuit comprising:
   (a) a capacitor for storing tripping energy,
   (b) tripping means operable to effect circuit-breaker tripping,
   (c) means comprising a normally-off switching device that can be turned on to cause said capacitor to discharge through said tripping means to effect operation thereof,
   (d) a plurality of charging circuits associated with the respective phases of said power circuit for charging said capacitor from the current through said phases even when said phases are free of overcurrent,
   (e) each charging circuit comprising means including a current transformer having a secondary winding associated with one phase and rectifying means in circuit therewith for deriving from the associated phase a pulsating unidirectional current having a magnitude that varies as a direct function of the current through said phase,
   (f) means for supplying said pulsating current to said capacitor to increase the voltage appearing thereacross,
   (g) and means for establishing a low impedance path across the current transformer secondary winding of the charging circuit that is performing a charging operation when the instantaneous voltage across said capacitor during a charging operation reaches a predetermined level, thereby blocking a further increase in the voltage appearing across said capacitor, comprising:
      (i) normally nonconducting thyristors for the respective secondary windings each having its anode-to-cathode circuit connected across the associated secondary winding and having a gate for rendering said thyristor conductive when energized by a triggering signal, and
      (ii) voltage-responsive means responsive to the voltage across said capacitor during a charging operation for applying a triggering signal to said gate when the voltage across said capacitor reaches said predetermined level,
   (h) and blocking means comprising unidirectionally-conductive current blocking devices located electrically between said capacitor and each of said gates in circuit locations to prevent said capacitor from discharging through said gates.

4. The power supply of claim 3 in which:
   (a) said voltage-responsive means comprises a breakdown device common to all of said charging circuits connected between the anode and gate of one of said thyristors, and
   (b) means for applying a triggering signal to the gates of all of said thyristors when said breakdown device breaks down.

5. A power supply for supplying tripping energy for a circuit breaker connected in a power circuit comprising:
   (a) a capacitor for storing tripping energy,
   (b) tripping means operable to effect circuit-breaker tripping,
   (c) means comprising a normally-off switching device that can be turned on to cause said capacitor to discharge through said tripping means to effect operation thereof,
   (d) means for charging said capacitor from said power circuit even when said power circuit is free of overcurrent, comprising:
      (i) means comprising a current transformer having a secondary winding and rectifying means in circuit with said secondary winding for deriving from said power circuit a pulsating unidirectional current having a magnitude that varies as a direct function of the current through said power circuit,
      (ii) means for supplying said pulsating current to said capacitor to increase the voltage appearing across said capacitor,
      (iii) and means for establishing a low impedance path across said current transformer secondary winding when the instantaneous voltage across said capacitor during a charging operation reaches a predetermined level, thereby blocking a further increase in the voltage appearing across said capacitor,
   (e) and blocking means preventing said capacitor from discharging through said low impedance path,
   (f) said secondary winding comprising two sections with an output lead connected to an intermediate point between said sections and output leads connected to opposite terminals of said sections and connected together at a junction point,
   (g) said rectifying means comprising half-wave rectifiers respectively in series with the latter of said output leads,
   (h) and a pair of resistors respectively in series with said winding sections, one resistor being located electrically between said intermediate point and one of said half-wave rectifiers and the other resistor being located electrically between said intermediate point and the other of said rectifiers.

References Cited

UNITED STATES PATENTS

| | | | |
|---|---|---|---|
| 3,255,384 | 6/1966 | Riebs | 317—33 X |
| 3,351,814 | 11/1967 | Riebs | 317—33 X |
| 3,005,942 | 10/1961 | Perdreaux et al. | 320—1 |
| 3,196,334 | 7/1965 | Flanders | 320—1 |
| 3,260,917 | 7/1966 | Shimwell et al. | |
| 3,263,099 | 7/1966 | Bedford | 320—1 X |
| 3,374,402 | 3/1968 | Derc | 317—151 |
| 3,408,539 | 10/1968 | Legg et al. | 317—36 |

FOREIGN PATENTS 1,101,653  4/1955  France.

LEE T. HIX, Primary Examiner

W. H. BEHA, Jr., Assistant Examiner

U.S. Cl. X.R.

317—151; 321—14